United States Patent
Gardner

(10) Patent No.: US 9,626,516 B1
(45) Date of Patent: Apr. 18, 2017

(54) CONTROLLING USE OF ELECTRONIC DEVICES

(71) Applicant: Amazon Technologies, Inc., Seattle, WA (US)

(72) Inventor: Brock Robert Gardner, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/945,231

(22) Filed: Nov. 18, 2015

(51) Int. Cl.
  *G06F 1/16* (2006.01)
  *G06F 21/60* (2013.01)
  *H05K 7/14* (2006.01)
  *F41H 13/00* (2006.01)

(52) U.S. Cl.
  CPC ......... *G06F 21/60* (2013.01); *F41H 13/0093* (2013.01); *H05K 7/1497* (2013.01); *H05K 7/1495* (2013.01)

(58) Field of Classification Search
  CPC .. F41H 13/0087; F41H 13/0093; F41H 13/00; G06F 21/60; H05K 7/1497; H05K 7/1495
  USPC .................................................... 361/679.57
  See application file for complete search history.

(56) References Cited

U.S. PATENT DOCUMENTS

| | | | | |
|---|---|---|---|---|
| 6,683,245 | B1 * | 1/2004 | Ogawa | H05K 9/0037 174/382 |
| 8,655,939 | B2 * | 2/2014 | Redlich | F41H 13/00 707/602 |
| 9,420,733 | B2 * | 8/2016 | Logan | H05K 9/0007 |
| 2007/0105445 | A1 * | 5/2007 | Manto | H05K 7/1497 439/620.09 |
| 2012/0140431 | A1 * | 6/2012 | Faxvog | H05K 9/0049 361/818 |
| 2013/0194772 | A1 * | 8/2013 | Rojo | H04Q 1/112 361/818 |
| 2016/0162693 | A1 * | 6/2016 | Breuer | G06F 21/602 713/164 |

* cited by examiner

*Primary Examiner* — Nidhi Thaker
(74) *Attorney, Agent, or Firm* — Kilpatrick Townsend & Stockton LLP

(57) ABSTRACT

An ElectroMagnetic Pulse (EMP) emitter can be positioned to introduce an EMP burst or series of EMP bursts into a passageway, such as a passageway providing access relative to a secure area. The EMP burst or series of EMP bursts can be introduced into the passageway at an intensity configured for rendering inoperable an electronic device, such as a device capable of data storage and transport through the passageway. Such an arrangement may be used for the prevention of theft, sabotage, or release of data maintained within the secure area.

16 Claims, 2 Drawing Sheets

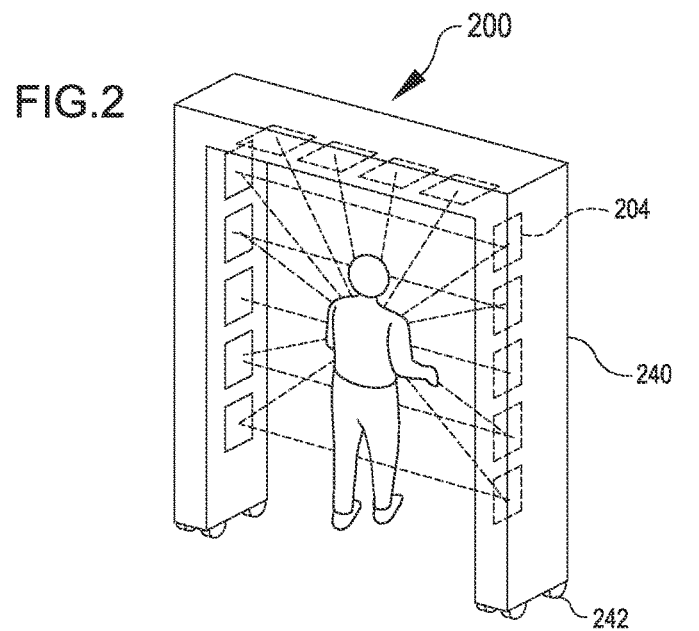
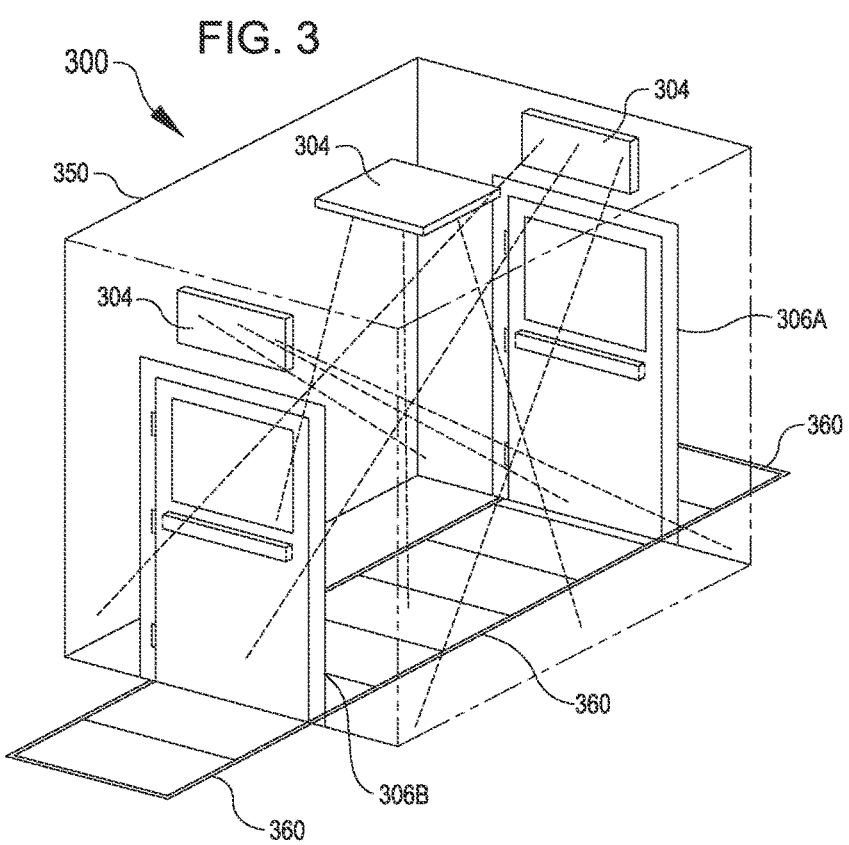

CONTROLLING USE OF ELECTRONIC DEVICES

BACKGROUND

A datacenter is a facility used to house a collection of computer servers and associated components, typically network hardware. The collection of computer servers is often called a "server cluster" or "server farm," and is designed to meet server needs far beyond the capability of a single machine. The networking hardware typically includes network switches and/or routers which enable communication between the different parts of the server farm and the users of the server farm. Datacenters are commonly used for cluster computing, web services, remote data storage, web hosting, and other web services. Datacenters are increasingly being used by enterprises instead of, or in addition to, mainframe computers.

As the demand for datacenters continues to increase, the security of the data handled in datacenters becomes an increasing concern. Software authorization components and security components can provide reasonable protection against attempts to remotely access information on computer devices. Such software components can often be economically implemented to prevent, for example, hackers or other unauthorized individuals from using a network connection to obtain or tamper with data handled in datacenter servers. However, remote access is typically not the only concern. Other difficulties may arise when addressing data security threats from local or physical access. In the absence of adequate safeguards, a thief may steal a computer or components of a computer and carry this plunder out of a datacenter to later access data on the computer or to sell the hardware components. Alternatively, a saboteur may sneak an electronic device into a datacenter and use information or other capabilities of the device to corrupt or otherwise negatively impact datacenter data, such as by introducing a virus or other malicious code through physical or direct interfaces with servers in the datacenter. As increasingly smaller electronic devices become increasingly available, detection of such devices being carried in or out of a datacenter can become increasingly difficult, expensive, and/or otherwise infeasible.

BRIEF DESCRIPTION OF THE DRAWINGS

Various embodiments in accordance with the present disclosure will be described with reference to the drawings, in which:

FIG. 2 illustrates a frame for a data security system using multiple electromagnetic pulse emitters according to certain embodiments; and FIG. 3 illustrates a chamber for a data security system using multiple electromagnetic pulse emitters according to certain embodiments.

DETAILED DESCRIPTION

Figure 1:
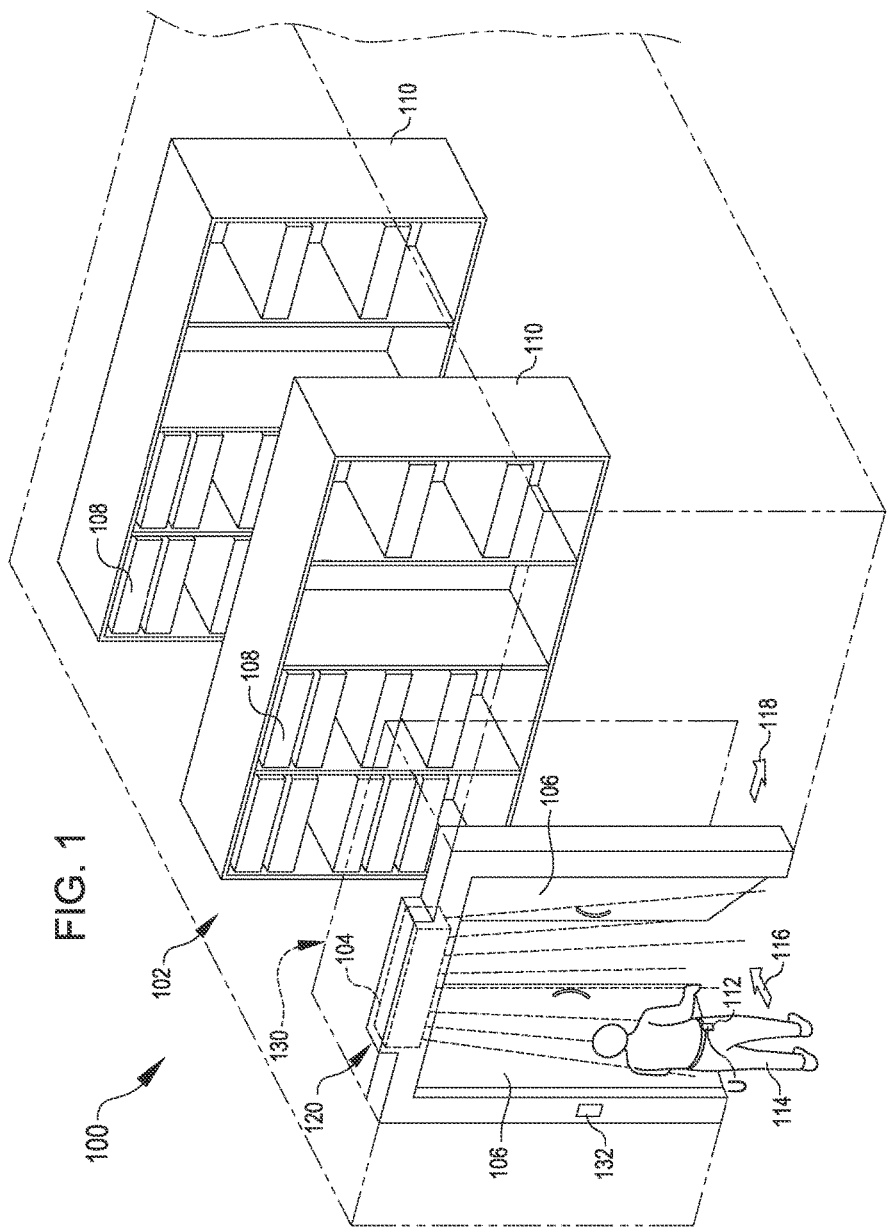
FIG. 1 illustrates a datacenter room having a data security system utilizing an electromagnetic pulse emitter according to certain embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described herein include use of electromagnetic pulse (EMP) emitters to damage and/or cause destruction of electronic devices transported into and/or out of a secure area or zone. These techniques may be used for the prevention of theft of, tampering with, and/or release of data maintained within the secure area. Such techniques may find particular application in data security systems in datacenters or other environments where the safekeeping of sensitive or critical data is important.

Data security systems can include one or more EMP emitters that can be operated to provide an EMP burst to a targeted zone, such as a passage providing access to or from a secure area. Such an EMP burst can damage or render inoperable electronic devices situated in the targeted zone. In effect, this may degrade, eliminate, or otherwise neutralize data-storing or data-processing capabilities (including, e.g., functionality such as accessing data from another electronic device and/or loading data to another electronic device) of any electronic devices (such as flash drives, hard drives, or other memory stores that are readily portable by a human being) that may otherwise be carried undetected into or out of the secure area. Additionally, the EMP blasts can be positioned and/or controlled to prevent damage to servers or other electronics storing data in the secure area. For example, the orientation and/or magnitude of the EMP burst may be controlled to prevent negative effects of the EMP burst from being experienced by components within the secure area. Additionally or alternatively, shielding can be provided between the EMP emitter and the electronics of the secure area. Thus, data security systems with EMP emitters can function to prevent threats to secure data that may otherwise go undetected.

Data security systems described herein have particular application to protection of computer equipment and computer devices. The computer devices can be, for example, in a datacenter or other facility used to house computer systems and components. A datacenter can include rooms, which in turn include racks. The racks can include individual components, such as servers and/or network components. Any or all of these can be protected by the data security systems described herein.

For example, the entire datacenter can include such a data security system at a front door. Similar data security systems can be used at a room level. A rack may be any frame or enclosure capable of mounting one or more servers or other computing devices. In some applications, the rack can be a four-post server rack, a server cabinet, an open-frame two-post rack, a portable rack, a LAN rack, combinations of the same, or the like. Datacenter components that are maintained in a rack can be protected using one of the data security systems described herein.

Referring now to the drawings, FIG. 1 illustrates a data security system 100 implemented for a secure area 102 such as a room of a datacenter. The data security system 100 includes an EMP emitter 104 located proximate to doors 106 of the secure area 102. The secure area 102 in FIG. 1 includes servers 108 and other network components arranged in racks 110, but the secure area 102 may additionally or alternatively correspond to any other secure area having computing devices or other sources of data to be protected. Computing devices may include, for example, storage devices, servers, routers, phones, laptops, etc.

The EMP emitter 104 can provide an EMP. An EMP is a burst or blast of electromagnetic energy that can disable or destroy electronic devices within the range of the EMP. An EMP can induce a signal in the recipient equipment, e.g., inducing high currents and voltages that cause damage to the equipment and disrupt or destroy its function. The degree of damage or destruction to electronic devices may depend on a duration or magnitude of the EMP. The effect of the EMP may be permanent with sufficient duration or magnitude. For example, an EMP may be effective to destroy the data-loading or -carrying capabilities of various types of data storage media including, but not limited to, magnetic media or flash media. EMP generators are known and can be purchased and/or produced with capabilities corresponding to certain ranges and/or magnitudes of EMP bursts. Generally. EMP emitters (such as coils or loops of wire) can be coupled with power generators (such as capacitors) and triggering mechanisms that can be located separately from the EMP emitter, such as through wiring extending among the various components.

In operation, the data security system 100 can destroy any non-authorized electronic devices passing in or out of a secure area 102. In an example scenario shown in FIG. 1, a person 114 may carry an electronic device 112 containing non-authorized or unauthorized data U. The person 114 may attempt to follow a passageway or path (illustrated by arrows 116 and 118) into the room of the datacenter while carrying the unauthorized data U on the electronic device 112. In some embodiments, the path illustrated by arrows 116 and 118 is the only path of travel for persons into or out of the secure area 102, and all other paths are blocked by walls, gates, fences, barbed wire, and/or other physical and/or security barriers. The EMP emitter 104 is directed toward a portion of the path 116 and provides an EMP to that portion of the path 116. The EMP directed to that portion of the path 116 by the emitter 104 can disable and/or destroy the electronics in the electronic device 112, thereby disabling and/or destroying the data-carrying capabilities of the electronic device 112, along with the unauthorized data U stored on the electronic device 112. In this manner, the EMP emitter 104 functions as a guard to the path 116 and works to improve a likelihood that non-authorized or unauthorized data U shall not pass. The EMP emitter 104 may be configured to secure against unauthorized data U, regardless of whether the unauthorized data U is being transported in or out of the secure area 102. The EMP emitter 104 can also be positioned to provide a disabling EMP burst or series of EMP bursts (of equal or varying magnitude) to any electronic device located anywhere in the path 116. For example, the EMP emitter 104 may be effective to reduce or destroy data-carrying capabilities of the electronic device 112 regardless of whether the electronic device 112 is in a middle of the path 116 (e.g., as depicted on a belt of the person 114) or near a boundary or edge of the path 116 (such as if the electronic device 112 is in a shoe of the person 114 or otherwise transported near the floor, doorframe, or other boundary of the path 116). The EMP burst can have a magnitude of, for example, 1 KV/m, 50 KV/m, 100 KV/m, 200 KV/m, 500 KV/m, 1000 KV/m, or another magnitude. In embodiments, suitable signage etc. may be implemented to comply with health, safety, or other regulations related to EMP emitters, such as to warn individuals with pacemakers or other sensitive electronic devices about potential risks to such devices.

The EMP emitter 104 may be directed toward the path 116 in any suitable manner. In some embodiments, the EMP emitter 104 is capable of directing EMPs towards the portion of the path 116 as a result of the particular configuration of the EMP emitter, such as the orientation of a coil if the coil is used as the EMP emitter 104. In some embodiments, the EMP may be directed using shielding 120 about the EMP emitter 104. For example, in the embodiment illustrated in FIG. 1, the shielding 120 is provided on a top, front, back, left and right of the emitter so that the EMP provided by the emitter will be directed downwards towards the portion of the path 116 that provides ingress or egress from the secure area 102. The shielding or orientation of the EMP emitter 104 can additionally or alternatively be adjusted to focus the EMP toward other directions in addition to or as alternatives to directly downward. For example, the EMP emitter 104 may be directed in such a manner that an EMP from the EMP emitter 104 is directed not only downward but also laterally so that the focus of the EMP is in an area in front of (and not solely along) the doors 106 to the secure area 102.

The data security system 100 can protect the servers 108 or other equipment in a secure area 102 from an EMP from the EMP emitter 104 in any suitable manner. For example, in FIG. 1, a barrier 130 is provided between the EMP emitter 104 and the servers 108. The barrier 130 is illustrated as a wall or partition that the person 114 will navigate around (e.g., along a path illustrated arrow 118) in order to reach the servers 108. The barrier 130 includes shielding to dissipate or block the EMP signal from reaching the servers 108. Suitable forms of shielding include sheet metal, metal screen, metal foam, metal ink, metal spray, metal coating, and metal-lined plastic materials, among others. In some embodiments, the barrier 130 may correspond to walls, partitions, curtains, or other structures (e.g., with suitable shielding), for example, which may be added to retrofit the secure area 102 at a datacenter or other secure data site to protect from effects of the EMP emitter 104 that might otherwise travel through open doors 106 and reach and harm servers 108.

Other techniques for preventing damage from the EMP emitter 104 to the servers 108 can also be used. For example, the EMP emitter 104 may be calibrated to emit an EMP at a particular intensity that will be sufficient to destroy electronics (such as the non-authorized device 112) in a close range corresponding to a distance between the EMP emitter 104 and the targeted portion of the path 116, but insufficient to cause harm at a distance at which the servers 108 are located from the EMP emitter 104.

In some embodiments, shielding barriers between the EMP emitter 104 and the servers 108 may be movable. For example, in FIG. 1, the EMP emitter 104 may be triggered based on a motion detector 132 proximate the doors 106. In response to motion detected by the motion detector 132, the EMP emitter 104 may be triggered to produce an EMP of a sufficient duration and/or magnitude for disabling data-carrying electronics (such as the non-authorized device 112). The doors 106 may be maintained in a locked condition until the EMP burst is completed, thus ensuring that data-carrying components are fully destroyed before being allowed to pass into the secure area 102.

Additionally, the EMP emitter 104 may be triggered in any suitable manner. For example, as described above, the EMP emitter may be triggered in response to a motion detector 132. Alternatively, the EMP emitter 104 may be triggered when the doors 106 to the secure area 102 change conditions, such as when the doors 106 are opened or closed. As another alternative, the EMP emitter 104 may be triggered manually, such as by a security guard manning the security checkpoint formed by the doors 106 into the secure area 102.

Other data security systems can also utilize EMP emitters for protecting data by preventing transportation of data-carrying devices into or out of a secure area by destroying the data carrying capability of the devices while in transit.

FIG. 2 illustrates one such example data security system 200. The data security system 200 includes a frame 240 with a plurality of EMP emitters 204. The frame 240 also includes rolling elements 242, such as to allow the frame to be mobile. The EMP emitters 204 can be directed relative to the frame 240 (such as via shielding arranged in a channel or other structure about the EMP emitters 204, via the EMP emitters 204 being appropriately oriented, or some combination thereof) so that the EMP bursts generated by the EMP emitters 204 are limited or constrained to occur within a volume defined by the frame 240. This arrangement can provide additional advantages such as ease of mobility relative to—or within—a datacenter or a secure zone. In some embodiments, metal detecting features may be included in the frame 240 or elsewhere in the data security system 200, such as to detect metal shielding around an electronic device for protecting against an EMP burst.

FIG. 3 illustrates another embodiment of a data security system 300. In the data security system 300, a chamber 350 is provided. The chamber includes walls or other boundaries with sufficient shielding material to prevent EMP bursts from reaching electronic devices outside of the chamber 350. Alternatively, the chamber 350 may be configured as a Faraday cage, e.g., having grounded metal screens surrounding the chamber 350 that exclude electromagnetic influences from passing through the boundaries of the chamber 350. Doors 306 in and out of the chamber (respectively, 306A and 306B) can also provide adequate shielding to prevent EMP bursts from reaching secure data storage components. The chamber 350 can include EMP emitters 304 directed to provide a variety of orientations of EMP bursts, such as to increase the likelihood that the EMP bursts will be arranged at an appropriate orientation to electronic devices in the chamber to partially or completely disable the capabilities of the electronic devices in the chamber 350. This arrangement may be beneficial in that less precise directing of EMP emitters 304 is possible without risking harm to secured data components such as the servers 108 depicted in FIG. 1.

Other uses of systems described herein are also possible. For example, decommissioned hard drives, solid-state drives (SSDs), handheld electronics (e.g., cell phones, tablet computers), wearable computers, USB drives, or other data-storage media may be passed through systems described herein or otherwise subjected to bursts from EMP emitters. This may effectively destroy any data that may be remaining on the decommissioned media and prevent access of that data when the media has been disposed of. This may prevent inadvertent release of the data from the secure area when disposing of electronic devices from the secure area. This may also provide a cleaner alternative to shredding or other data destruction alternatives in a datacenter. For example, hard drives or other storage media that have been processed by EMP emitters can be transported offsite for recycling or appropriate disposal of the materials in the decommissioned media, rather than warranting infrastructure for handling such waste streams at the datacenter. In one illustrative example of intentionally introducing electronic devices for destruction by EMP emitters, the chamber 350 shown in FIG. 3 includes a conveyor belt 360 that can move electronic devices relative to the chamber 350 for movement into, out of, and/or through the chamber 350 before, during, and/or after operation of the EMP emitters 304, such as for movement independent of being carried by a human. Other modifications to the chamber 350 may also be made. For example, chutes or other conveyance mechanisms may be used in addition to and/or in lieu of the conveyor belt 360. In some embodiments, doors 306 or other features of the chamber may additionally or alternatively be altered in size or other characteristics, such as to configure the chamber 350 to be sufficiently large to receive and process electronic devices while being sufficiently small to inhibit and/or prevent human travel through the chamber 350.

Based on the disclosure and teachings provided herein, a person of ordinary skill in the art will appreciate other ways and/or methods to implement the various embodiments. The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A datacenter, comprising: a secure area comprising a computing device; a passageway for travel between the secure area and another area; an ElectroMagnetic Pulse (EMP) emitter positioned to introduce an EMP burst into the passageway at an intensity configured to damage an electronic device that is transported through the passageway: wherein the EMP emitter is at least one of positioned, shielded, or configured so as to prevent damage to the computing device from the EMP burst; and a frame positioned in the passageway, wherein the EMP emitter is positioned within shielding in the frame so as to constrain the EMP burst from the EMP emitter to affect a volume defined by the frame.

2. The datacenter of claim 1, wherein the EMP emitter is positioned adjacent a door at the passageway.

3. The datacenter of claim 1, further comprising shielding that is positioned between the EMP emitter and the data store or arranged relative to the EMP emitter so as to direct the EMP burst from the EMP emitter.

4. The datacenter of claim 1, wherein the EMP emitter is positioned to provide the EMP burst into the passageway so as to disable the electronic device regardless of where the electronic device is located in the passageway.

5. The datacenter of claim 1, wherein the EMP burst comprises a series of EMP bursts.

6. A passageway defined by at least one of a frame or walls, the passageway comprising:
an ElectroMagnetic Pulse (EMP) emitter positioned to introduce an EMP burst or series of EMP bursts into the passageway at an intensity configured for rendering inoperable an electronic device that is transported through the passageway, wherein the passageway is in a datacenter and provides access to a secure area inside the datacenter that comprises a data store, wherein the EMP emitter is shielded so as to constrain the EMP burst or series of EMP bursts from the EMP emitter to affect a volume defined relative to the passageway so as to prevent damage to the data store from the EMP burst or series of EMP bursts.

7. The passageway of claim 6, wherein the EMP emitter is positioned to provide the EMP burst or series of EMP bursts to the electronic device regardless of where the electronic device is located in the passageway.

8. The passageway of claim 7, further comprising at least one of:
shielding positioned between the EMP emitter and the data store; or
shielding arranged relative to the EMP emitter so as to direct the EMP burst or series of EMP bursts from the EMP emitter.

9. The passageway of claim 6, wherein the EMP emitter is positioned adjacent a door of the passageway.

10. The passageway of claim 6, further comprising a chamber positioned in the passageway, wherein the EMP emitter is positioned within the chamber, and wherein boundaries of the chamber prevent the EMP burst or series of EMP bursts from the EMP emitter from leaving the chamber.

11. The passageway of claim 6, further comprising a conveyance mechanism configured for moving the electronic device relative to the passageway.

12. A datacenter, comprising: a secure area comprising a computing device; a passageway for travel between the secure area and another area; an ElectroMagnetic Pulse (EMP) emitter positioned to introduce an EMP burst into the passageway at an intensity configured to damage an electronic device that is transported through the passageway, wherein the EMP emitter is at least one of positioned, shielded, or configured so as to prevent damage to the computing device from the EMP burst; and a chamber positioned in the passageway, wherein the EMP emitter is positioned within the chamber, and wherein boundaries of the chamber prevent the EMP burst from the EMP emitter from having effects outside of the chamber.

13. The datacenter of claim 12, wherein the EMP emitter is positioned adjacent a door at the passageway.

14. The datacenter of claim 12, further comprising shielding that is positioned between the EMP emitter and the data store or arranged relative to the EMP emitter so as to direct the EMP burst from the EMP emitter.

15. The datacenter of claim 12, wherein the EMP emitter is positioned to provide the EMP burst into the passageway so as to disable the electronic device regardless of where the electronic device is located in the passageway.

16. The datacenter of claim 12, wherein the EMP burst comprises a series of EMP bursts.

* * * * *